INVENTOR
KIYOJI FUJISAWA

BY Wenderoth, Lind & Ponack

ATTORNEYS

United States Patent Office 3,532,808
Patented Oct. 6, 1970

3,532,808
METHOD AND SYSTEM FOR MAGNETICALLY RE-
CORDING AND REPRODUCING TELEVISION
SIGNALS AND REDUCING AMPLITUDE VARIA-
TION OF THE REPRODUCED TELEVISION
SIGNALS
Kiyoji Fujisawa, Hirakata-shi, Japan, assignor to Matsu-
shita Electric Industrial Co., Ltd., Osaka, Japan
Filed Feb. 2, 1967, Ser. No. 613,623
Claims priority, application Japan, Feb. 2, 1966,
41/6,472; Feb. 10, 1966, 41/8,253; Mar. 30,
1966, 41/20,171
Int. Cl. H04n 5/78
U.S. Cl. 178—6.6
11 Claims

ABSTRACT OF THE DISCLOSURE

A method and system for magnetically recording and reproducing television signals in which a conventional television signal is supplied to a modifying circuit comprising a delay circuit, a level shift circuit, a switch circuit, a clipper and pulse generators and modified into a signal in which additional signals having a potential in the vicinity of the average level of input signal are inserted in blanking positions. This modified signal is recorded on magnetic tape by conventional manner. For reproduction, the recorded signal picked up by a magnetic head is amplified by a preamplifier and corrected by an equalizer with respect to the amplitude and the phase, and then top parts of the additional signal contained in the corrected signal are clamped to fixed potential by a clamper so that the average video level of the reproduced television signal becomes almost constant and the undesirable "lateral striped pattern" caused by amplitude variation is greatly decreased.

BACKGROUND OF THE INVENTION

Field of the invention

This invention relates generally to systems and methods for magnetically recording and reproducing composite information signals containing timing signals, and more particularly to systems and methods for magnetically recording and reproducing composite television signals containing synchronizing pulses and blanking pulses by employing a direct recording method which performs the recording of said composite signals by using a high frequency bias or direct current bias.

Prior art

At the present time the magnetic recording and reproducing of television signals is usually accomplished by employing frequency modulation. The equipment using this recording method is not affected by a variation in the amplitude of the reproduced signals and satisfactorily reproduces television signals in a wide frequency range extending from a few cycles to several megacycles per second. This method, however, requires a complicated circuit arrangement for the frequency modulation. Moreover, a magnetic head-and-tape system having a wider frequency band than that of the television signals is necessary for reproduction of a carrier frequency and some upper side band frequencies which are produced as a result of the modulation.

A direct recording method has advantages in that there is no need to employ a modulator, demodulator, etc., necessary for carrying out said frequency modulation method, and in that maximum response in the magnetic head-and-tape system can be used for television signals. However, there is no commercially available equipment using the direct recording method because of the following problems:

(1) The first problem is variations in the amplitude of the reproduced signals. The variations usually result from unevenness in the tape coatings, magnetic particle clumping, and irregularities in the magnetic head-to-tape contact. Among these variations the variations which have the most effect are those which appear randomly and which are slow variations. As a matter of fact, it is difficult to make equipment which can suppress such variations. A recording method employing frequency modulation can eliminate the amplitude variation of the reproduced signals by using a limiter in the reproducing circuit, whereas with a direct recording method, because the amplitude of the reproduced signals is representative of the picture signals, a limiter cannot be used and as a result there is a brightness variation among the scanning lines appearing on the cathode ray tube of the television receiver. This unevenness in the brightness between scanning of lines produces an undesirable noisy pattern which results in a poor image quality. This noisy pattern will hereinafter be referred to as a "lateral striped pattern."

(2) The second problem is difficulty in reproducing vertical synchronizing pulses included in composite television signals. The difficulty comes from the fact that the reproducing head can hardly pick up a field frequency of 60 cycles per second, which is the fundamental frequency of the vertical synchronizing pulses. If it is assumed that the current in the recording head and the resulting magnetization of the magnetic tape are directly proportional to the amplitude of the signals to be recorded, the amplitude of the reproduced signals will vary in a well known maner as the first derivative of the magnetization. In the magnetic head-and-tape system in which a head-to-tape speed is about 120 inches per second and the head is provided with a gap of about 40 microinch, this amplitude characteristic of the reproduced signals will be maintained up to a frequency of about 1 megacycle per second. In this case, the range in frequency or in amplitude, for signals at a frequency of 1 megacycle per second and a field frequency of 60 cycles per second, is over 16,666 to 1 or 84 db. An equalization of said characteristic, or a low frequency emphasis, is obtained by passing the reproduced signals into an integrating circuit. However, it is difficult to make an amplifier circuit which produces low frequency emphasis at 84 db and maintains a minimum signal-to-noise ratio of about 35 db which is required for an adequate signal-to-noise characteristic of the picture signal. Consequently, such integration equalization is restricted in practice. As a result, the image which appears on a cathode ray tube is apt to move vertically.

(3) The third problem is the influence of the low frequency noise which will be generated by the reproducing circuit. Since the direct recording method comprises a reproducing circuit having an integration characteristic as mentioned in the paragraph (2), a low noise amplifier must usually be employed for the low signal level stage. Therefore, when a transistor amplifier is used in the reproducing circuit, this integration characteristic emphasizes the transistor noise expressed by an "1/f" characteristic. This noise results in the undesirable "lateral striped pattern" as mentioned in the paragraph (1) and impairs the image quality.

(4) The fourth problem is the fact that the reproduced synchronizing pulses vary in shape and size with a variation in the average video level of the television signals. The reason is as follows. With respect to the synchronizing pulses, the D.C. component varies with the variation in the average video level of the television signals and causes a variation in the "spacing loss" of the magnetic head-and-tape system. As a result, the amplitude of the high frequency component picked up by the reproducing head from the magnetic tape is changed. This is apt to impair the synchronization of the television receiver. A lower recording level can prevent the unstable synchronization but results in a lower signal-to-noise ratio of the reproduced signals.

There have been reported various methods for solving the problems mentioned above. Two examples of these methods are as follows: In one method of reducing the effect of the amplitude variation, the frequency band of the television signal is divided into high and low frequency portions. The high-frequency portion is directly recorded on the magnetic tape so as to take full advantage of the maximum magnetic head-to-tape response. The frequency modulation method is used for recording the low-frequency portion so as to permit the use of a limiter for greatly reducing the effect of the amplitude variation.

In one method of satisfactorily reproducing the synchronizing pulses, the synchronizing pulses contained in the composite television signal are replaced by a burst of signals of a definite high frequency. Further, it is necessary in order to enable detection of the burst of signals in the reproduced signal by a high-pass filter that the burst of signals be an oscillatory burst having a frequency which is above the upper limits of the frequency band of the composite television signal but within the frequency response limits of the magnetic head-and-tape system.

These methods require complicated circuits. The former method requires a frequency modulation circuit which prevents simplification of the circuit. Furthermore, two record tracks are necessary for recording the television signal.

In the latter method, the circuit is simple in comparison with the circuit necessary for the former method, but the frequency bandwidth in the magnetic head-and-tape system cannot be used efficiently for the picture signals because of the existence of the burst signals.

SUMMARY OF THE INVENTION

A general object of this invention is to provide a method and apparatus for the direct recording and reproducing of television signals, which apparatus economically produces the images having a quality similar to that of signals obtained by conventional equipment carrying out a frequency modulation method of recording.

Another object of this invention is to provide a method and apparatus for decreasing the undesirable "lateral striped pattern" which appears on the cathode ray tube due to the amplitude variation in the reproduced signals when the signals, such as television signals containing synchronizing pulses and blanking pulses, are magetically recorded and reproduced by a direct recording method.

Still another object of this invention is to provide a method and apparatus for substantially reproducing the vertical synchronizing pulses which will otherwise not be picked up because the magnetic head can hardly pick up the low frequency component from the magnetic tape.

A further object of this invention is to provide a method and apparatus for decreasing the influence of said low frequency noise which forms the undesirable "lateral striped pattern" due to the amplitude variation in conventional direct recording equipment.

A still further object of this invention is to provide a method and apparatus for satisfactorily reproducing the horizontal synchronizing pulses in direct recording equipment.

The present invention provides a method and a system for achieving these objects, the system comprising a modifying circuit means for modifying a composite television signal containing synchronizing pulses, blanking pulses and like signals by inserting a signal with a potential in the vicinity of the average level of the input composite television signal into said input composite television signal during the time of the blanking pulse at a time other than when the synchronizing pulses are present. This is accomplished by creating a train or trains of pulses corresponding in time to the front porch or back porch portions, or both, of the blanking pulses, and using these trains of pulses to switch off the composite signal and supply to it the signals with the requisite potential. In addition, means can be provided for limiting the level of the synchronizing pulses so that they just exceed the black level of the picture portion of the composite signal. For reproducing the recorded modified composite television signals, the picked up signal is first equalized so that it has a waveform similar to that of the modified signal, and then the parts of the signal having said potential are clamped by means of clamping circuit means to hold them to a fixed potential so that the recorded signal has an average level essentially the same as that of said input composite television signal.

BRIEF DESCRIPTION OF THE DRAWINGS

The invention will now be described with reference to the accompanying drawings, in which.

DESCRIPTION OF PREFERRED EMBODIMENTS

This invention utilizes the fact that in composite television signals which are transmitted in accordance with the standards effective in the United States or foreign countries, the picture signal representing the brightness and darkness of the various areas of the picture is periodically eliminated by synchroniizng pulses which control the performance of the television receivers or like terminal equipment, and by blanking pulses the video level of which corresponds to the black video level of zero brightness of the picture.

Systems and methods of magnetically recording and reproducing television signals in accordance with this invention employ a modified signal including additional signals inserted into a part of the blanking pulses for satisfactorily recovering an average level as well as the D.C. level of the recorded composite television signal.

Figure 1:
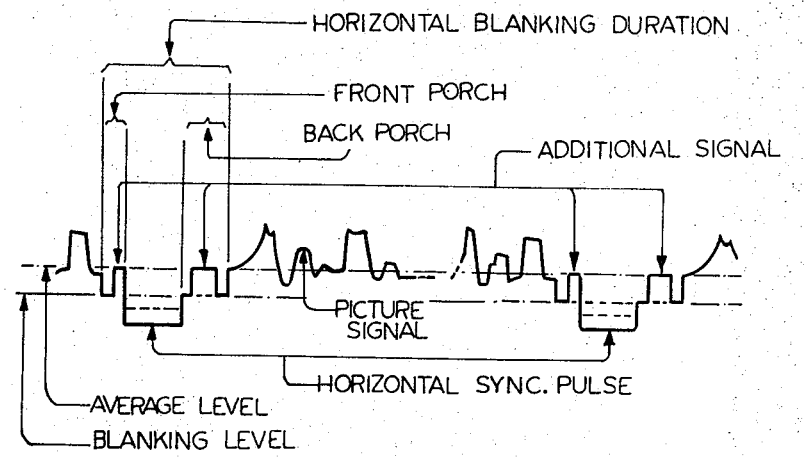
FIG. 1 is a diagrammatic view illustrating a waveform of a conventional composite television signal modified in accordance with the present invention.

One waveform of the television signal which is modified by a recording process according to this invention is shown in FIG. 1. This modified waveform is different from the waveform of a conventional composite television signal in that a part of each of the conventional blanking pulses shown in dotted lines is shifted to the average video level of the television signal by inserting the additional signals, and also in that the synchronizing pulses originate from said average level. The waveform shown in FIG. 1 is an example in which the level of both the front and the back porch portions of the blanking pulse are shifted to the average level of the television signal. However, the novel effect can also be attained by the modification of the front porch portion only or the back porch portion only.

Figure 2:
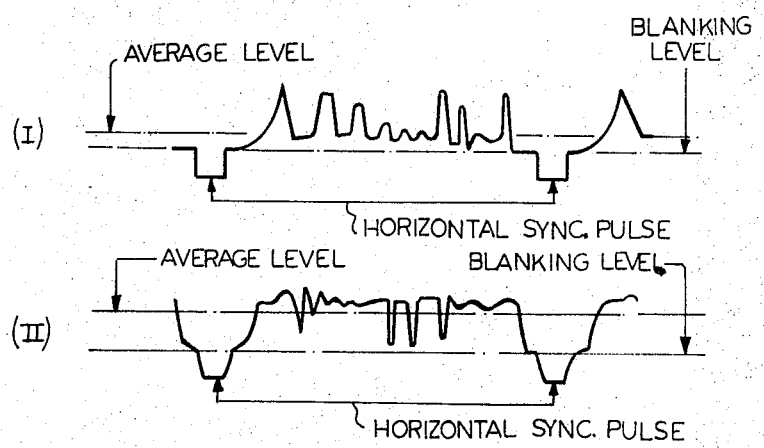
FIGS. 2(I) and (II) are diagrammatic views illustrating waveforms of a conventional composite television signal reproduced by conventional direct recording and reproducing equipment when the average video level of the television signal changes.

A television signal having the conventional waveform will first be explained in order to enable a better understanding of the effect due to this modification. The waveforms of two television signals to be recorded and having the same amplitude but the different average video levels and which are reproduced by conventional direct recording and reproducing equipment are shown in FIG. 2. In FIG. 2, the waveform (I) is for a low average level signal and a waveform (II) is for a high average level signal. It will be understood from a comparison of the two waveforms that the reproduced horizontal synchronizing pulses have a longer rise time and a distorted form as shown in waveform (II) when the average video level of the signal is high. The reason for this is as follows. With respect to the synchronizing pulses, the higher average level of the television signal results in an increase in the value of the D.C. component which in turn causes an increase in the "spacing loss" of the magnetic head-and-tape system. This results in a decrease in the amplitude of the high frequency component picked up from the magnetic tape.

In contrast with said conventional signals, the value of the D.C. component of the horizontal synchronizing pulses shown in FIG. 1 is constant and low because the horizontal synchronizing pulses are modified so that they originate from the average level of the television signal. Therefore, when the composite television signal having this modified waveform is recorded, it is apparent that the horizontal synchronizing pulses of the reproduced signal always have a desirable waveform which is characterized by a shorter rise time and a constant shape.

In the coventional composite television signal, the ratio of the maximum amplitude of the picture signals to the amplitude of the synchronizing pulses is approximately 2.4 to 1 and therefore about 70% of the overall amplitude of the composite television signal is used for the picture signals. Referring to FIG. 1, the amplitude of the synchronizing pulse, as shown by a fine dotted line, can be controlled to exceed the level of the picture signal corresponding to the blanking level only slightly in a downward direction. Accordingly, about 90% of said overall amplitude can be used for the picture signals and therefore the signal-to-noise ratio can be improved by at least 2 db.

The influence of the amplitude variation of the reproduced signal can be reduced by holding the additional signals representing an average video level of the recorded television signal, as shown in FIG. 1, to a fixed potential during the reproducing process in accordance with this invention. Consequently, the average brightness of the image appearing on the cathode ray tube becomes uniform and therefore the undesirable "lateral striped pattern" is also reduced to a minimum.

Because the television signal during the duration of the vertical blanking pulse is also provided with additional signals at the average video level in the same way as mentioned above for the horizontal blanking pulses, the D.C. level during said duration and the vertical synchronizing pulses are substantially completely recovered.

Figure 3:
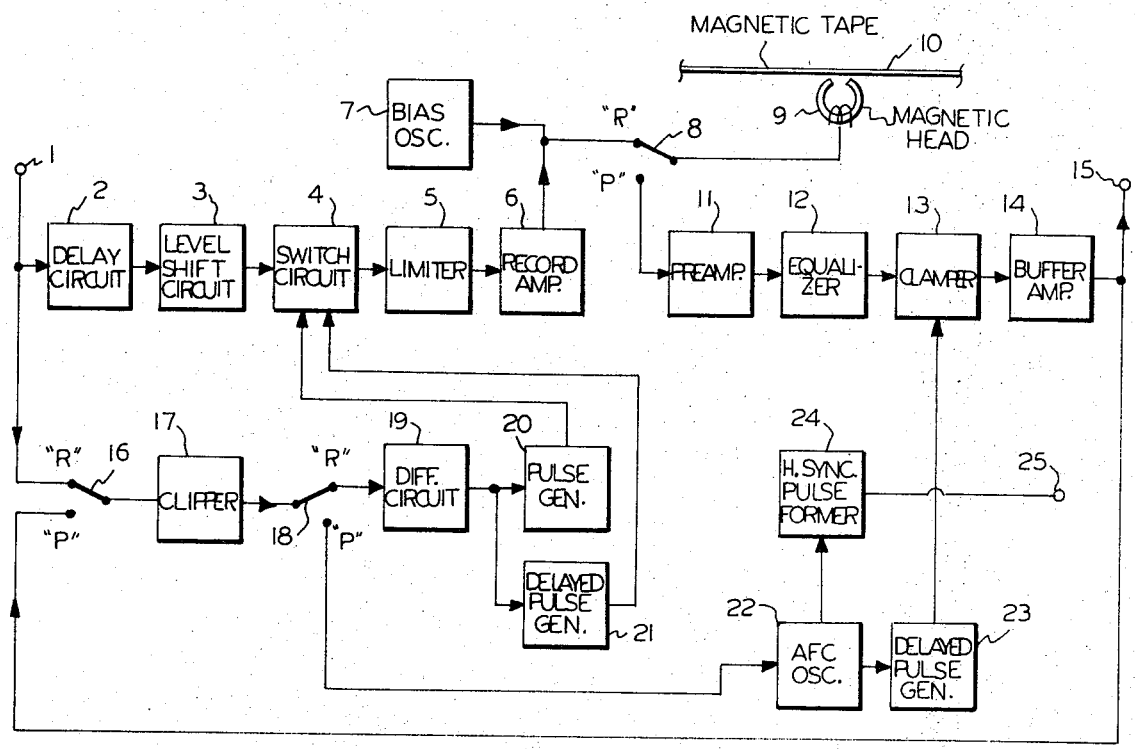
FIG. 3 is a circuit diagram of a direct recording and reproducing system according to the present invention.

The modification of the television signal according to this invention can be accomplished, for example, by a circuit shown in FIG. 3. The waveforms occurring at different points during the opertaion of the circuit of FIG. 3 are shown in FIG. 4.

Initially, a recording operation will be explained by reference to the FIG. 3, wherein switches 8, 16 and 18 are thrown to the R position. A signal from a television camera or television receiver, i.e. the conventional composite television signal to be recorded, is assumed to have a waveform A shown in FIG. 4. For the purpose of describing the operation of this invention, this waveform A contains, i.e. a portion in which the picture signal is blanked in order to permit vertical movement of the beam in the cathode ray tube, as well as a picture signal portion. Said signal which is supplied at an input terminal 1 is fed to a clipper 17 and to a delay circuit 2. The clipper 17 separates the synchronizing pulses from said signal of the waveform A and generates pulses having a waveform B shown in FIG. 4. A differentiating circuit 19 alters the pulses of waveform B into narrow pulses or "spikes" having a waveform C in FIG. 4, which waveform C is supplied to a pulse generator 20 and a delayed pulse generator 21. The pulse generator 20 is triggered by the positive spikes of the waveform C and supplies a first pulse train having a waveform D of pulses with a pulse-width $T_D$ as shown in FIG. 4 to a switching circuit 4. This pulse-width $T_D$ is controlled so that it is narrower than the duration $T_F$ of the front porch of the horizontal blanking pulses of the conventional composite television signal. A suitable pulse-width $T_D$ is about 1 microsecond. The delayed pulse generator 21 is triggered similarly by said positive spikes and after a time delay $\tau_E$ generates a second pulse train having a waveform E of pulses with a pulse-width $T_E$. The time relationships for each pulse of this second pulse train E, as shown in FIG. 4, are as follows: the time delay $\tau_E$ of the leading edge is expressed by $\tau_E \geq T_D + T_H$ and the time of the trailing edge is expressed by $\tau_E + T_E \leq T_D + T_H + T_B$, where $T_D$ is the pulse-width of the pulses of said first pulse train, $T_H$ is the pulse-width of the horizontal synchronizing pulses, which is about 5 microseconds and $T_B$ is the duration of the back porch of the horizontal blanking pulse and is about 4 microseconds. Accordingly, suitable times of $\tau_E$ and $T_E$ are about 6 microseconds and 3 microseconds respectively. This second pulse train E is supplied to the switching circuit 4 together with said first pulse train. Since the spikes of waveform C are produced by all the synchronzing pulses contained in said input composite television signal as clearly shown in FIG. 4, both said first and second pulse trains also have pulses in the time relationships described for the vertical blanking portions as well as the synchronizing pulses in the picture signal portions.

On the other hand, the delay circuit 2 delays the television signal having the waveform A supplied to the the input terminal 1. This delay circuit 2 acts in such a way that the time of the leading edge of each horizontal synchronizing pulse contained in the television signal which is supplied to the switching circuit 4 through a level shifting circuit 3 coincides with the time of the trailing edge of the pulses in said first pulse train having the waveform D which is supplied to the switching circuit 4. The necessary time delay will be the sum of the pulse-width $T_D$ of the pulses of the first pulse train generated by said pulse generator 20 and having waveform D and the time delay caused naturally by the clipper 17, the differentiating circuit 19, and the pulse generator 20, as mentioned above.

Figure 4:
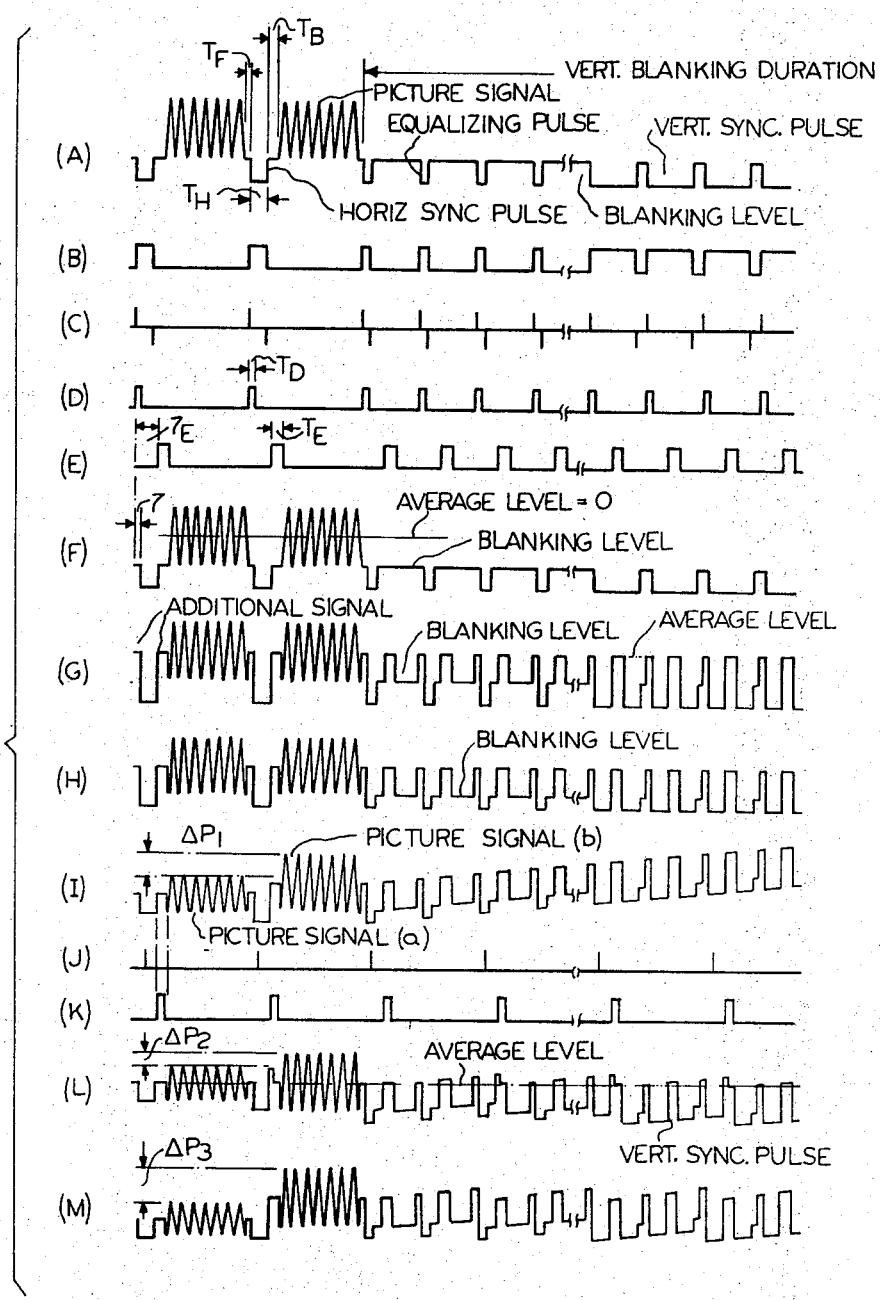
FIGS. 4A-4M are diagrammatic views illustrating waveforms occurring at different points during the operation of the direct recording and reproducing system shown in FIG. 3.

The level shifting circuit 3 shifts the average level of the conventional composite television signal supplied through said delay circuit 2 to a predetermined potential, e.g., zero potential as shown in the waveform F of FIG. 4. The switching circuit 4 operates in such a way that the composite television signal F supplied from said level shifting circuit 3 is transmitted to the output terminal thereof when the pulses of waveforms D and E are not present, and said signal F is blocked from the output terminal and simultaneously the switching circuit output terminal potential is switched to a predetermined potential, e.g., zero potential when the pulses of waveforms D and E are present. As mentioned above, the time of the leading edge of each of the horizontal synchronizing pulses of the television signal F is caused to coincide with the trailing edge of each of the pulses of the first pulse train D by the action of said delay circuit 2, and the pulses of the second pulse train E are located within the duration of the back porch portion of the horizontal blanking pulses of the waveform F by the action of said delayed pulse generator 21. Consequently, at the output terminal of the switching circuit 4, there appears a waveform which has the front porch and back porch portions of the blanking pulse of the signal shifted to the average level of the conventional composite television signal as shown in waveform G of FIG. 4. This signal having a waveform G is an example of the modified composite television signal according to this invention. The additional signals at the average level of the conventional composite television signal to be recorded are periodically inserted in the front porch and back porch portions of the blanking pulses of the television signal, and the synchronizing pulses originate from said average level. This waveform is shown in detail in the picture signal portion in FIG. 1.

The synchronizing pulses in the waveform G have a large amplitude. Because it is sufficient that this amplitude exceeds only slightly in the negative direction the black level of the picture signals so that it is possible to detect the synchronizing pulses in the composite television signal during the reproducing process, the excess portion of the amplitude is removed by a limiter 5. As a result, a waveform H as shown in FIG. 4 is obtained, and the signal-to-noise ratio of the picture signal can be improved, as mentioned above.

A recording amplifier 6 amplifies said modified signal having the waveform H so as to provide a magnetic head 9 with a suitable recording current. Further, the recording amplifier 6 has a high output impedance so that the current in the magnetic head 9 will be directly proportional to the amplitude of said modified signal and independent of the frequencies contained in said modified signal. A bias oscillator 7 generates an oscillatory current which has a frequency higher than the highest frequency among said modified signals to be recorded, e.g., a frequency of 4 megacycles per second, and is coupled to the magnetic head 9 so as to provide it with a bias current to be superposed on said recording current so as to produce an undistorted recording. As a result, said modified composite television signal in accordance with this invention is satisfactorily recorded on the magnetic tape 10.

Referring again to FIGS. 3 and 4, and explanation of the reproducing operation will be given. In this operation switches 8, 16 and 18 are thrown to the p position. The modified composite signal recorded on the magnetic tape 10 is picked up by the magnetic head 9, amplified by a pre-amplifier 11 and then corrected by a equalizer 12 with respect to the amplitude and the phase. This equalizer 12 consists of an integrator, an aperture compensator, etc. Said integrator equalizes the reproduced signal to a nearly constant amplitude at the low and middle frequency region, except for the very low frequency portions, which has the differentiation characteristic as mentioned above in connection with the problem 2 involved in direct recording. Said aperture compensator equalizes the reproduced signal to a more or less constant amplitude in the higher frequency region in which the amplitude falls rapidly with increasing frequency due to the losses such as the "gap loss" of the magnetic head depending on recorded wave-length. Therefore, the output waveform of said preamplifier 11 is corrected so as to have a waveform similar to that of the recorded signal. The signal as corrected by the equalizer 12 has a waveform I as shown in FIG. 4, wherein the amplitude variation of the reproduced signal is shown in an exaggerated form in such a way that the amplitude of the picture signal $a$ appears smaller than that of the picture signal $b$. The effect of the poor low-frequency-response is represented as a deviation of the vertical blanking portion of the signal upwardly from the normal level of the blanking portion of the signals. Said equalized signal having the waveform I passes through a clamper 13 and is amplified to a suitable amplitude by a buffer amplifier 14 and then is transmitted to the clipper 17 and from an output terminal 15 to a circuit in a video apparatus, for example, to a video amplifier tube in a television receiver. The clipper 17 separates the synchronizing pulses from the output signal of said buffer amplifier 14 and then supplies a pulse having a waveform similar to B of FIG. 4 to an automatic frequency controllable oscillator 22. However, an inspection of the disturbed waveform I, shows that said clipper 17 cannot always satisfactory separate the synchronizing pulses from said output signal. Even if the synchronizing pulses partially disappear, the automatic frequency controllable oscillator 22 can generate a narrow pulse or "spike" having a waveform J, shown in FIG. 4, at a definite interval, e.g., a horizontal synchronizing period, because this oscillator has a memory device which can oscillate continuously at a frequency controlled by the input pulse. This output spike is supplied to a horizontal synchronizing pulse former 24 and to a delayed pulse generator 23. The horizontal synchronizing pulse former 24 produces a horizontal synchronizing pulse which is effective to ensure the horizontal synchronization in the video apparatus mentioned above, and the thus produced pulse appears at an output terminal 25. The delayed pulse genertaor 23 is triggered by the spikes of the waveform J and generates a pulse train having a waveform K which has the pulses located within the duration of the additional signals inserted in the back porch portion of the composite signal during the recording process as shown in FIG. 4. Since said pulse train K provides a pulse or "keying pulse" which produces the clamping action on the clamper 13, the clamper 13 can clamp the top parts of the additional signals contained in the waveform I at a constant potential. Consequently, a television signal which is amplified by the buffer 14 and which appears at the output terminal 15 has a waveform characterized by having the top parts of the additional signals arranged as shown in the waveform L of FIG. 4.

The level of the top parts of the additional signal is substantially the average level of the conventional composite television signal described in connection with the recording process and is approximately equal to the average video level of that signal. Although an exact coincidence is not obtained due to the existence of the synchronizing pulses and blanking pulses, the average video level of the reproduced television signal becomes almost constant. This will be readily understood from the fact that the difference $\Delta P_2$ between the white reference level of the picture signal $a$ and that of the picture signal $b$ shown in the waveform L has a value smaller than the corresponding value $\Delta P_1$ in the corresponding value in the waveform I, shown in FIG. 4. Consequently, the average brightness of the image appearing on the cathode ray tube of the television receiver becomes almost constant, and the undesirable "lateral striped pattern" caused by the amplitude variation is greatly decreased. Moreover, the similar "lateral striped pattern," which may be caused due to the low frequency noise generated in the reproducing circuit, can be decreased by said clamping action.

The direct recording method according to this invention greatly decreases the amplitude variation which occurs at a slow rate and is usually a large variation as mentioned above, but this method cannot remove a rapid variation which is usually small. However, since this rapid variation relates to the fine detail portions of the picture such as edge transitions and closely spaced line patterns, its effects are not particularly noticeable in the reproduced picture.

A direct recording method is apt to lose low frequency components during the reproducing process, and therefore to produce a disturbed vertical blanking signal such as in the waveform I shown in FIG. 4. However, the waveform I can be corrected to the waveform L in which the vertical synchronizing pulses are substantially completely recovered by having their amplitude lowered to a level below the blanking level by clamping the additional signals at a constant potential.

A waveform M shown in FIG. 4 appears when the vertical synchronizing pulses are recovered by clamping the top of the synchronizing pulses in a conventional manner. In this case, the amplitude variation has a greater effect on the picture sginal as shown by $\Delta P_3$. This occurs in the case where the reproduced signal disappears partly due to the socalled "drop out." Said conventional clamping method produces a lower video level than the black level. Such lower video level appears as a black line on the cathode ray tube and makes for bad picture quality. On the other hand, according to the invention, since the brightness of the scanning lines appearing on the cathode ray tube is retained at an average brightness by the average level clamping, the picture quality is greatly improved even when the reproduced signal partly disappears due to "drop out."

The above explanation of the circuit shown in FIG. is for an example in which the additional signals are inserted in the back porch portion as well as the front porch portion of the blanking pulses and the additional signal in the back porch portion is clamped at a constant potential. This method has the advantage that it is easy to design the automatic frequency controllable oscillator 22 which is used during the reproducing process. That is, the back porch portion has a duration of about 4 microseconds, which is twice that of the front porch. Therefore, the additional signals can be made to have a duration long enough to be sufficiently clamped at a constant potential even when the interval of the keying pulses varies slightly due to the disappearance of the synchronizing pulses which are supplied to the automatic frequency controllable oscillator 22. Accordingly, a relatively unrefined design can be used for the automatic frequency controllable oscillator 22.

Figure 5:
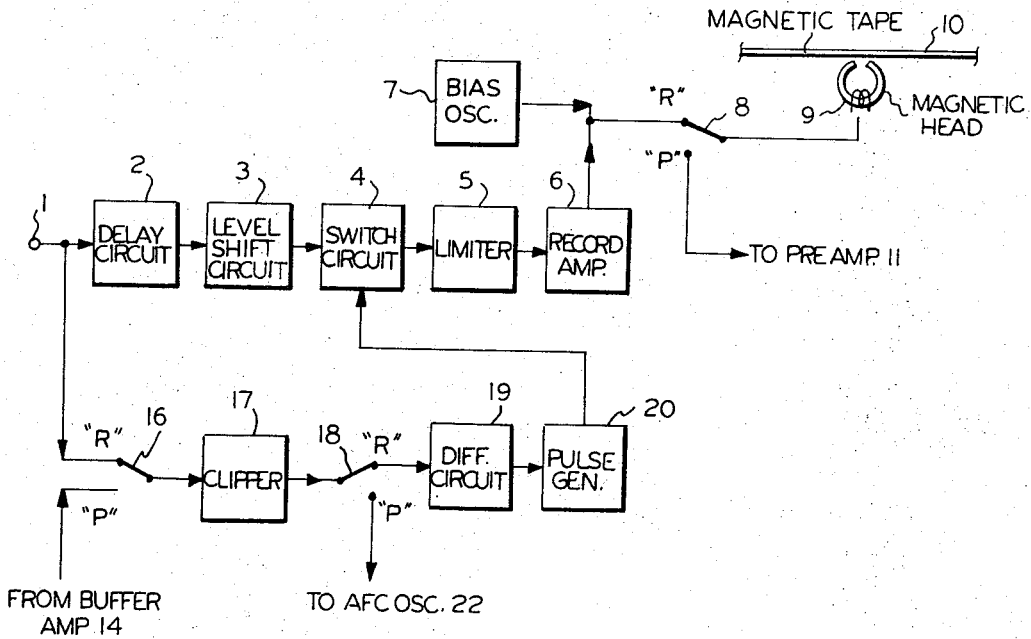
FIG. 5 is a circuit diagram of another direct recording system according to the present invention.
Figure 6:
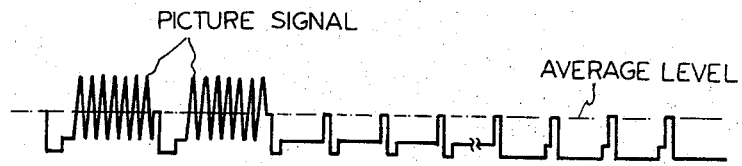
FIG. 6 is a diagrammatic view illustrating the waveform of a modified composite television signal produced by the direct recording system shown in FIG. 5.
Figure 6A:
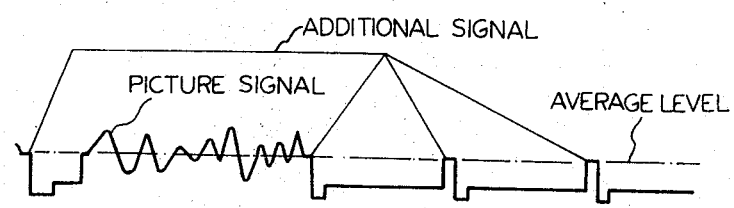
FIG. 6a is a detail of FIG. 6.

A circuit as shown in the diagram of FIG. 5 can be used for inserting the additional signal in the front porch portion only. This circuit does not include the aforesaid delayed pulse generator 21 which is included in the circuit of FIG. 3, so that the additional signal is omitted from the back porch portion and there can be produced a modified composite television signal having a waveform as shown in FIGS. 6 and 6a.

If it is desirable that said additional signal be inserted in the back porch only, the pulse generator 30 of FIG. 5 is replaced by a delayed pulse generator such as the generator 21 shown in FIG. 3.

Figure 7:
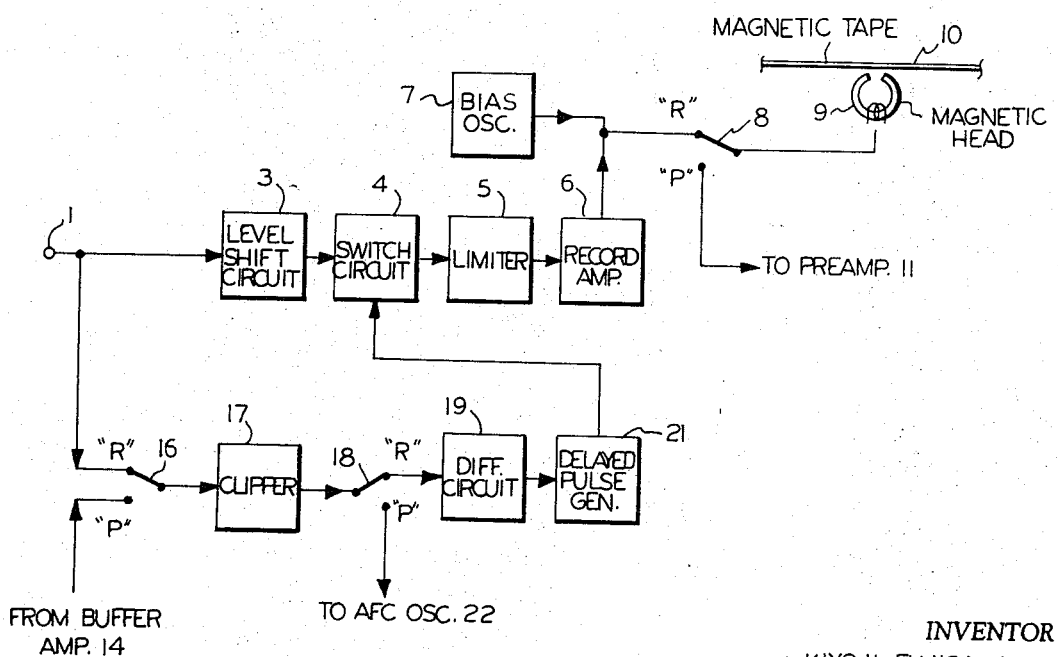
FIG. 7 is a circuit diagram of another simplified direct recording system according to the present invention.
Figure 8:
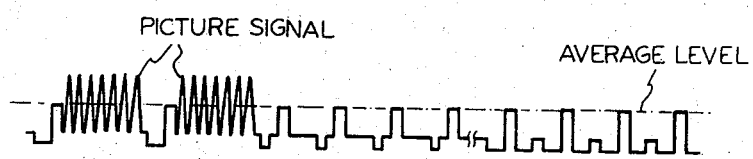
FIG. 8 is a diagrammatic view illustrating the waveform of a modified composite television signal obtained by the direct recording system shown in FIG. 7.
Figure 8A:
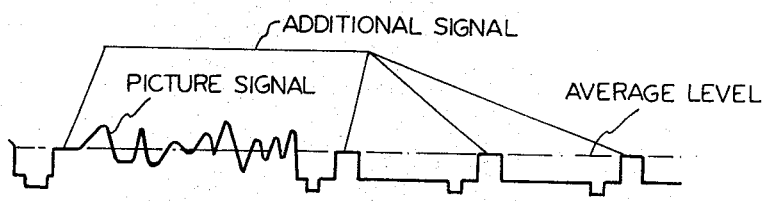
FIG. 8a is a detail of FIG. 8.

A more convenient method is to employ a circuit shown in the diagram of FIG. 7 which excludes the delay circuit 2 of FIGS. 3 and 5. In the circuit diagram of FIG. 7, the additional signal can be caused to coincide with the duration of back porch portion of the blanking pulse by controlling the time delay of said delayed pulse generator 21 instead of delaying the television signal by the delay circuit 2. As a result, there can be produced a modified composite television signal having the waveform shown in FIGS. 8 and 8a. The position of the additional signal in the back porch portion of this waveform, of course, can also be controlled by adjusting the time delay of said delayed pulse generator 21. In the case where the additional signal is inserted into the back porch portion only, however, since the synchronizing pulse does not originate from the average video level, as seen in FIGS. 8 and 8a, a poor horizontal synchronizing pulse may be reproduced. Accordingly, it is desirable to apply this circuit in a magnetic tape-and head system which has very good characteristics of both the frequency band and the linearity of the amplitude.

Figure 9:
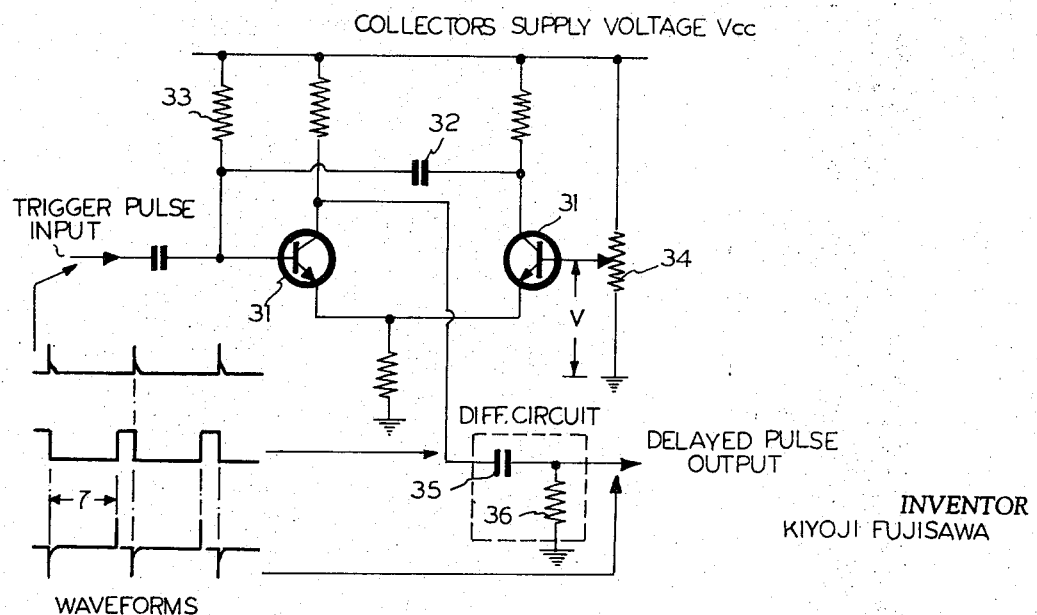
FIG. 9 is a circuit diagram of a monostable multivibrator which can be used in the direct recording and reproducing system in accordance with the present invention.
Figure 10:
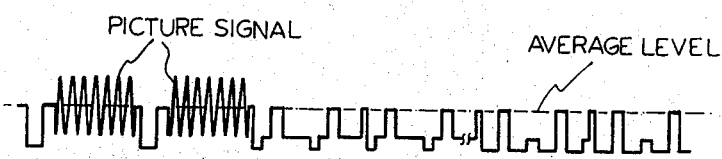
FIG. 10 is a diagrammatic view illustrating the waveform of a modified composite television signal obtained by using the monostable multivibrator of FIG. 9 in the direct recording system shown in FIG. 3.
Figure 10A:
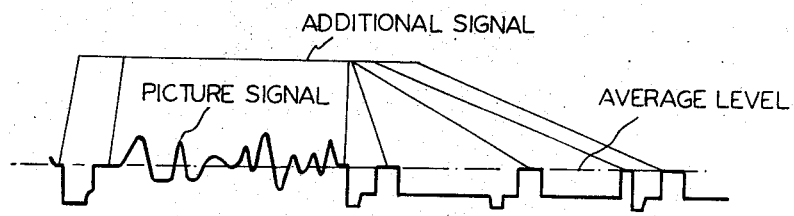
FIG. 10a is a detail of FIG. 10.

The omission of the delay circuit from an apparatus for recording or reproducing a television signal as shown in FIG. 7 results in a low cost because an expensive delay line is necessary to produce a time delay for a signal having a wide frequency band. A monostable or "one-shot" multivibrator shown in FIG. 9 is an example of an inexpensive delay circuit which can be used for this purpose. This circuit is a well known emitter-coupled monostable multivibrator. This multivibrator is triggered by the positive spike-shaped pulse supplied to the base of a transistor 30 and generates a pulse having a duration $\tau$ at the collector of the transistor 30. The collector of the transistor 30 is connected to a differentiating circuit which consists of a capacitor 35 and a resistor 36, so that a positive spike-shaped pulse delayed relative to said triggering spike-shaped pulse by a time $\tau$ corresponding to the pulse duration appears at the output terminal, as shown in FIG. 9. The duration of the pulse appearing at the collector of the transistor 30 is mainly determined by both the time constant of a CR coupling circuit consisting of a capacitor 32 and a resistor 33 and a potential V which is supplied from a potentiometer 34 to the base of a transistor 31. For example, in the circuit of FIG. 3, there can be produced a modified composite television signal having a waveform as shown in FIG. 10 when the time delay is controlled so as to be close to the horizontal scanning time, i.e., about 60 microseconds, by putting the aforesaid multivibrator circuit between the differentiating circuit 19 and the pulse generator 20.

Further, the automatic frequency controllable oscillator 22 can also be placed in the pre-stage of the pulse generators 20 and 21 during the recording process. For example, in the case where this modification is applied to the circuit of FIG. 3 since said oscillator generates the pulses at an interval coincident with the horizontal synchronizing period, there can be produced a waveform which excludes the additional signals in the vicinity of the equalizing pulses which do not coincide with the horizontal synchronizing period at the vertical blanking duration.

A simpler circuit than that shown in FIGS. 3, 5 and 7 can be constructed by dual usage of a "synchronizing pulse separator" and an "AFC circuit" for stabilizing the horizontal scanning, which circuits are usually included in a conventional television receiver, instead of the clipper 17 and the automatic frequency controllable oscillator 22.

In above explanation, the actual circuits used in each stage are not shown, but it is evident that they are variout well-known types of circuits. Further, separated magnetic heads can be used for the recording and reproducing respectively.

In the case where an additional signal is inserted in the back porch of the blanking pulse, since a part of the blanking pulse is changed from the conventional blanking level to an average level, there will occur the question of whether retrace lines of the horizontal scanning will appear on the cathode ray tube. However, the interference of the retrace can hardly be observed on the cathode ray tube because the retrace time is about one or several tenths the scanning time of the picture signal and therefore the brightness of the retrace will be low. If the blanking pulse is necessary for solving completely the problem mentioned above and for producing a conventional composite television signal waveform, the necessary blanking pulse can be easily generated by a circuit similar to those supplying the keying pulse to the clamper 13 as is known in the art.

In the preceding description, the additional signal is defined as being at the average level of the conventional composite television signal. However, it is not always necessary that the level of the additional signal be exactly equal to an average level of the signal. For example, the additional signal can be at the average level of the picture portion of the television signal. In the case of the circuit of FIG. 3, this modification can be accomplished by supplying only the picture signal portion to the level shifting circuit 3 and by putting a circuit for inserting the synchronizing pulse previously separated out between the switching circuit 4 and the limiter 5. This can also be accomplished more simply by adjusting the potential of the additional signal which is inserted by the switching circuit 4 to a potential which is determined by considerations of the existence of the synchronizing pulse and the blanking pulse. The additional signal mentioned in this invention should be considered as a signal which is at a level in the vicinity of an average level of the television signal.

While there have been described and illustrated some forms of circuits for providing suitable reproduced signals for direct recording and reproducing of a composite television signal, it is natural that many other modifications or variations may be employed. Accordingly, this invention should be considered to include all modifications or variations falling within the spirit and scope of the following claims.

What is claimed is:

1. A method of magnetically recording an input composite television signal containing synchronizing pulses, blanking pulses, and like signals, which comprises the steps of inserting a signal having a potential in the vicinity of the average level of said input composite television signal into part of the duration of said input composite television signal during the time when said blanking pulses are present and at a time other than when horizontal synchronizing pulses from among said synchronizing pulses are present, and at intervals corresponding to the intervals of said horizontal synchronizing pulses; and magnetically recording the thus modified signal on the magnetic recording medium.

2. A method of magnetically recording and reproducing an input composite television signal containing synchronizing pulses, blanking pulses and like signals, which comprises the steps of inserting a signal having a potential in the vicinity of the average level of said input composite television signal into part of the duration of said input composite television signal during the time when said blanking pulses are present and at a time other than when horizontal synchronizing pulses from among said synchronizing pulses are present; and at intervals corresponding to the intervals of said horizontal synchronizing pulses; magnetically recording the thus modified signal; translating said magnetically recorded signal into an electrical signal; equalizing the waveform of said electrical signal to a waveform similar to that of said modified signal; and clamping the parts of said inserted signal having said potential in the vicinity of the average level of said input composite television signal and contained in said equalized signal to a fixed potential so that the reproduced signal has an average level essentially the same as that of said input composite television signal.

3. A method of magnetically recording and reproducing an input composite television signal containing synchronizing pulses, blanking pulses including vertical blanking pulses and horizontal blanking pulses which have a front porch portion and a back porch portion and like signals, which comprises the steps of generating a first pulse train having a narrower pulse-width than said front porch portion and a second pulse train having a narrower pulse-width than said back porch portion at intervals corresponding to the intervals of horizontal synchronizing pulses from among said synchronizing pulses, the time of the leading edge of each pulse of said second pulse train being delayed relative to that of the trailing edge of each pulse of said first pulse train by a time corresponding to the pulse-width of said horizontal synchronizing pulse; coordinating the time of the leading edge of each of said horizontal synchronizing pulses so that it coincides with that of the trailing edge of each pulse of said first pulse train; switching off said blanking pulses and supplying in their places additional signals having a potential in the vicinity of the average level of said input composite television signal and a pulse width the same as the pulses in said first and second pulse trains so as to produce a modified signal; magnetically recording said modified signal on the recording medium; translating said magnetically recorded signal into an electrical signal; equalizing the amplitude and the phase of said electrical signal so as to produce a waveform similar to that of said modified signal; and clamping the top parts of the additional signal having said potential in the vicinity of the average level of said input composite television signal contained in said equalized signal to a fixed potential so that the reproduced signal has an average level essentially the same as that of said input composite television signal.

4. A method of magnetically recording and reproducing an input composite television signal containing synchronizing pulses, blanking pulses including vertical blanking pulses and horizontal blanking pulses which have a front porch portion and a back porch portion and like signals, which comprises the steps of generating a pulse train having a narrower pulse-width than said front porch portion at intervals corresponding to the intervals of horizontal synchronizing pulses from among said synchronizing pulses; coordinating the time of the leading edge of each of said horizontal synchronizing pulses so that it coincides with that of the trailing edge of each pulse of said pulse train; switching off said blanking pulses and supplying in their places additional signals having a potential in the vicinity of the average level of said input composite television signal and a pulse width the same as the pulses in said pulse train so as to produce a modified signal; magnetically recording said modified signal on the recording medium; translating said magnetically recorded signal into an electrical signal; equalizing the amplitude and the phase of said electrical signal so as to produce a waveform similar to that of said modified signal; and clamping the top parts of the additional signal having said potential in the vicinity of the average level of said input composite television signal contained in said equalized signal to a fixed potential so that the reproduced signal has an average level essentially the same as that of said input composite television signal.

5. A method of magnetically recording and reproducing an input composite television signal containing synchronizing pulses, blanking pulses including vertical blanking pulses and horizontal blanking pulses which have a front porch portion and a back porch portion and like signals, which comprises the steps of generating a pulse train having a narower pulse-width than said back porch portion at intervals corresponding to the intervals of horizontal synchronizing pulses from among said synchronizing pulses; coordinating the duration of each pulse of said pulse train with the duration of said back porch portion; switching off said blanking pulses and supplying in their places additional signals having a potential in the vicinity of the average level of said input composite television signal and a pulse width the same as the pulses in said pulse train so as to produce a modified signal; magnetically recording said modified signal on the recording medium; translating said magnetically recorded signal into an electrical signal; equalizing the amplitude and the phase of said electrical signal so as to produce a waveform similar to that of said modified signal; and clamping the top parts of the additional signal having said potential in the vicinity of the average level of said input composite television signal contained in said equalized signal to a fixed potential so that the reproduced signal has an average level essentially the same as that of said input composite television signal.

6. A method of magnetically recording and reproducing an input composite television signal containing synchronizing pulses, blanking pulses and like signals, which comprises the steps of inserting a signal having a potential in the vicinity of the average level of said input composite television signal into part of the duration of said input composite television signal during the time when said blanking pulses are present and at a time other than when horizontal synchronizing pulses from among said synchronizing pulses are present, and at intervals corresponding to the intervals of said horizontal synchronizing pulses; restricting the amplitude of said synchronizing pulses to a value exceeding only slightly the blanking level of said input composite television signal so as to produce a modified signal; magnetically recording said modified signal; translating said magnetically recorded signal into an electrical signal; equalizing the waveform of said electrical signal to a waveform similar to that of said modified signal; and clamping the parts of the said inserted signal having said potential in the vicinity of the average level of said input composite television signal contained in said equalized signal to a fixed potential so that the reproduced signal has an average level essentially the same as that of said input composite television signal.

7. A method as claimed in claim 6 wherein said blanking pulses have a front porch portion and a back porch portion, and said inserting step comprises the steps of generating a first pulse train having a narrower pulse-width than the front porch portion of the horizontal blanking pulse of said blanking pulses and a second pulse train having a narrow pulse-width than the back porch portion of said horizontal blanking pulse at intervals corresponding to the intervals of the horizontal synchronizing pulses from among said synchronizing pulses, the time of the leading edge of each pulse of said second pulse train being delayed relative to that of the trailing edge of each pulse of said first pulse train by a time corresponding to the pulse-width of the horizontal synchronizing pulses; coordinating the time of the leading edge of each said horizontal synchronizing pulse so that it coincides with that of the trailing edge of each of the pulses of said first pulse train; and switching off said blanking pulses and supplying in their places additional signals having a potential in the vicinity of the average level of said input composite television signal and a pulse width the same as the pulses in said first and second pulse trains.

8. A method as claimed in claim 6 wherein said blanking pulses include vertical blanking pulses and horizontal blanking pulses which have a front porch portion and a back porch portion, and said inserting step comprises the steps of generating a pulse train the pulses of which have a narrower pulse-width than said front porch portion at intervals corresponding to the intervals of horizontal synchronizing pulses of said synchronizing pulses, coordinating the time of the leading edge of each of said horizontal synchronizing pulses so that it coincides with that of the trailing edge of each pulse of said pulse train, and switching off said blanking pulses and supplying in their places additional signals having a potential in the vicinity of the average level of said input composite television signal and a pulse-width the same as the pulses in said pulse train.

9. A method as claimed in claim 6 wherein said blanking pulses include vertical blanking pulses and horizontal blanking pulses which have a front porch portion and a back porch portion, and said inserting step comprises the steps of generating a pulse train the pulses of which have a narrower pulse-width than said back porch portion at intervals corresponding to the intervals of horizontal synchronizing pulses of said synchronizing pulses, coordinating the duration of each pulse of said pulse train with the duration of said back porch portion; and switching off said blanking pulses and supplying in their places additional signals having a potential in the vicinity of the average level of said input composite television signal and a pulse-width the same as the pulses in said pulse train.

10. A system for magnetically recording and reproducing an input composite television signal containing synchronizing pulses, blanking pulses including vertical blanking pulses and horizontal blanking pulses which have a front porch portion and a back porch portion and like signals; said system including a magnetic head and a magnetic recording medium on which to record the signals, and further comprising pulse generating circuit means for periodically generating a pulse train having a narrow pulse-width at intervals corresponding to the intervals between horizontal synchronizing pulses of said synchronizing pulses; timing circuit means for coordinating the duration of each pulse of said pulse train with the part of the duration of said input composite television signal during the time when said blanking signals are present and at a time other than when said horizontal synchronizing pulses are present; switching circuit means which is responsive to said pulse train having said coordinated timing for supplying in the places of said blanking pulses additional signals having a potential in the vicinity of the average level of said input composite television signal by means of said pulse train having said coordinated timing so as to produce a modified signal; coupling circuit means for coupling said magnetic head and said switching circuit means; bias current supplying circuit means coupled to said magnetic head for providing said magnetic head with a bias current superposed on said modified signal to be recorded; equalizing circuit means coupled to said magnetic head for amplifying a signal picked up from said magnetic recording medium by said magnetic head and for correcting the waveform of said picked up signal to a waveform similar to that of said modified signal; keying pulse generating circuit means for continuously generating a keying pulse train having pulses with a narrower pulse-width than that of said additional signals at a definite interval controlled by said horizontal synchronizing pulses contained in said equalized signals, the duration of each pulse of said keying pulse train being coordinated with the duration of said additional signal; and clamping circuit means coupled to said equalizing circuit means and to which said keying pulse generation circuit means is coupled for clamping the parts of the additional signal having said potential in the vicinity of the average level of said input composite television signal contained in said equalized signal to a fixed potential by means of said keying pulse train so that the reproduced signal has an average level essentially the same as that of said input composite television signal.

11. A system for magnetically recording and reproducing an input composite television signal containing synchronizing pulses, blanking pulses including vertical blanking pulses and horizontal blanking pulses which have a front porch portion and a back porch portion and like signals; said system including a magnetic head and a magnetic recording medium on which to record the signals, and further comprising pulse generating circuit means for periodically generating a pulse train having a narrow pulse-width at intervals corresponding to the intervals between horizontal synchronizing pulses of said synchronizing pulses; timing circuit means for coordinating the duration of each pulse of said pulse train with the part of the duration of said input composite television signal during the time when said blanking signals are present and at a time other than when said horizontal synchronizing pulses are present; switching circuit means which is responsive to said pulse train having said coordinated timing for supplying in the places of said blanking pulses additional signals having a potential in the vicinity of the average level of said input composite television signal by means of said pulse train having said coordinated timing; limiting circuit means for restricting the amplitude of said synchronizing pulses to a value exceeding only slightly the blanking level of said input composite television signal so as to produce a modified signal; coupling circuit means for coupling said magnetic head and said limiting circuit means; bias current supplying circuit means coupled to said magnetic head and for providing said magnetic head with a bias current superposed on said modified signal to be recored; equalizing circuit means coupled to said magnetic head for amplifying a signal picked up from said magnetic recording medium by said magnetic head and for correcting the waveform of said picked up signal to a waveform similar to that of said modified signal; keying pulse generating circuit means for continuously generating a keying pulse train having pulses with a narrower pulse-width than that of said additional signals at a definite interval controlled by said horizontal synchronizing pulses contained in said equalized signals, the duration of each pulse of said keying pulse train being coordinated with the duration of said additional signal; and clamping circuit means coupled to said equalizing circuit means and to which said keying pulse generating circuit means is coupled for clamping the parts of the additional signal having said potential in the vicinity of the average level of said input composite television signal contained in said equalized signal to a fixed potential by means of said keying pulse train so that the reproduced signal has an average level essentially the same as that of said input composite television signal.

References Cited

UNITED STATES PATENTS 2,909,597   10/1959   Johnson _____ 178—6.6

RICHARD MURRAY, Primary Examiner

R. K. ECKERT, Jr., Assistant Examiner

U.S. Cl. X.R.

178—69.5